United States Patent [19]

Ohta

[11] Patent Number: 4,542,417
[45] Date of Patent: Sep. 17, 1985

[54] VIDEO SIGNAL MAGNETIC RECORDING AND REPRODUCING SYSTEM

[75] Inventor: Yoshihiko Ohta, Yokohama, Japan

[73] Assignee: Victor Company of Japan, Ltd., Kanagawa, Japan

[21] Appl. No.: 384,364

[22] Filed: Jun. 2, 1982

[30] Foreign Application Priority Data

Jun. 8, 1981 [JP] Japan .................................. 56-87659

[51] Int. Cl.$^4$ .............................................. H04N 5/76
[52] U.S. Cl. .................... 360/9.1; 360/36.1; 358/337
[58] Field of Search ...................... 360/9.1, 36.1, 38.1, 360/19.1, 35.1, 8.0; 358/320, 337

[56] References Cited

U.S. PATENT DOCUMENTS

| 3,758,710 | 9/1973 | Crosno | 360/36.1 |
| 3,763,328 | 10/1973 | Lester et al. | 360/8.0 |
| 3,919,716 | 11/1975 | Yumde et al. | 360/9.1 |
| 4,005,476 | 1/1977 | Dickopp et al. | 360/36.1 |
| 4,206,476 | 6/1980 | Hashimoto | 360/8.0 |
| 4,246,616 | 1/1981 | Hiraguri et al. | 360/10 |
| 4,402,023 | 8/1983 | Hiraguri | 360/77 |

OTHER PUBLICATIONS

Kybett, Video Tape Recorder, 1974, pp. 69-70, 78-80.

Primary Examiner—Robert L. Richardson
Attorney, Agent, or Firm—Ladas & Parry

[57] ABSTRACT

A video signal magnetic recording and reproducing system having a single rotary head, comprises a time base compression circuit for subjecting a video signal to be recorded to time base compression, to obtain a recording signal in which the time base is compressed in units of a predetermined period, where the recording signal in which the time base is compressed has intervals in which no signal exists between the units of the predetermined period, a recording and reproducing circuit for recording the recording signal in the units of the predetermined period obtained from the time base compression circuit onto a magnetic tape by a magnetic head for each scan, and reproducing the recording signal thus recorded, and a time base expansion circuit for subjecting the signal reproduced by the recording and reproducing circuit to time base expansion, to obtain a continuous reproduced signal.

9 Claims, 20 Drawing Figures

VIDEO SIGNAL MAGNETIC RECORDING AND REPRODUCING SYSTEM

BACKGROUND OF THE INVENTION

The present invention generally relates to video signal magnetic recording and reproducing systems, and more particularly to a video signal magnetic recording and reproducing system in which a recording video signal is recorded onto a magnetic tape after being compressed with respect to the time base, and a signal reproduced from the magnetic tape is expanded with respect to the time base to obtain a reproduced video signal.

Conventionally, so-called two-head system magnetic recording and reproducing apparatuses have been in wide practical use. In such a system, the video signal is alternately recorded onto and reproduced from tracks oblique with respect to the longitudinal direction of the magnetic tape, by two rotary heads. On the other hand, with the recent popularization of portable magnetic recording and reproducing apparatus, there is a demand for down-sizing the apparatus. Principally, if the relative linear speed between the magnetic head and the magnetic tape is constant, the diameter of a guide drum can be made smaller in a so-called one-head system using only one head. Hence, in order to satisfy the above demand for down-sizing the apparatus, it is preferable to use the one-head system.

As a type of this one-head system, there was a conventional system in which the magnetic tape is completely wound around the guide drum once in a spiral manner to form the shape of an α, and the video signal is recorded onto and reproduced from the magnetic tape by the single rotary head. However, in an apparatus in which the tape is automatically drawn out from a tape cassette accommodating the tape, to automatically load the tape onto a predetermined tape path along the guide drum, it is difficult to wind the tape around the guide drum in the shape of α. Accordingly, the above conventional one-head system cannot be applied to the automatic tape loading type recording and reproducing apparatus.

When applying the one-head system to the automatic tape loading type recording and reproducing apparatus, the tape is guided by a pair of guide poles in the shape of an Ω, as will be described later in conjunction with the drawings. Here, the pair of guide poles move while drawing out the tape from the tape cassette, and it becomes possible to automatically load the tape onto a predetermined tape path. However, when employing such a construction, a gap is inevitably formed between the pair of adjacent guide poles where the tape is not wound around the guide drum, in a state in which the loading of the tape is completed. Recording and reproduction cannot be performed with respect to the tape, during an interval in which the rotary head moves past the above gap. Thus, a period of lack of signal or signal lack is introduced in the reproduced signal during this interval.

As a counter measure against the above signal drop-out, there is a method in which the period during which the signal is not recorded and reproduced is positioned in an interval corresponding to a vertical blanking period so that the signal lack is put at an inconspicuous position in the reproduced picture, and the lacking vertical synchronizing signal is compensated for upon reproduction. However, even by this method, lack of the video information is introduced at an upper or lower part of the reproduced picture. In addition, there is a disadvantage in that it was difficult to maintain synchronism upon compensation of the vertical synchronizing signal. In another attempt to minimize the above signal lack interval, there is a method in which the pair of guide poles are moved to positions exceedingly close to each other in the state where the loading of the tape is completed. However, even according to this method, there is a limit in closing the gap between the pair of guide poles due to limitations in the mechanical precision and the like, and the period in which the recording and reproduction cannot be performed is inevitably introduced. Furthermore, in this case, a large load is introduced with respect to the tape travel, because the angular range with which the tape is wound around the guide drum is large. Thus, there was a disadvantage in that an excessive force is applied on the tape.

SUMMARY OF THE INVENTION

Accordingly, it is a general object of the present invention to provide a novel and useful video signal magnetic recording and reproducing system in which the above described disadvantages have been overcome.

Another and more specific object of the present invention is to provide a video signal magnetic recording and reproducing system in which, a recording video signal is compressed with respect to the time base and recorded onto a magnetic tape in a recording system, and a reproduced signal is expanded with respect to the time base to obtain a normal reproduced video signal in a reproducing system. According to the system of the present invention, a continuous reproduced signal can be obtained without introducing signal lack, by applying the system to a one-head system magnetic recording and reproducing apparatus in which there is a period during which a rotary head does not scan over the magnetic tape.

Other objects and features of the present application will be apparent from the following detailed description when read in conjunction with the accompanying drawings.

DETAILED DESCRIPTION

Figures 1A, 1B:
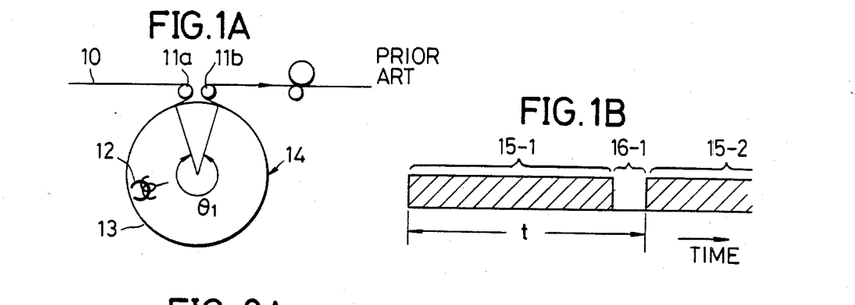
FIGS. 1A and 1B are a general plan view showing a guide drum part in a conventional one-head system magnetic recording and reproducing apparatus, and a graph for explaining an existing period and a lack period of a reproduced signal in the conventional apparatus.

In a conventional one-head system magnetic recording and reproducing apparatus, a magnetic tape 10 is guided by a pair of guide poles 11a and 11b, as shown in FIG. 1A. The tape 10 travels in a state wound obliquely around a guide drum 14. This guide drum 14 comprises a rotary drum 13 provided with a single magnetic head 12, and a fixed drum (not shown). On angular range $\theta 1$ throughout which the tape 10 is wound around the guide drum 14, is determined by the pair of guide poles 11a and 11b. However, as described above, no matter how close together these guide poles 11a and 11b are provided with respect to each other, it is impossible to set the above angular range $\theta 1$ to 360° because of the mechanical limitation. Thus, during an interval in which the head 12 rotates an angular range (360° - $\theta 1$), the head 12 cannot perform recording and reproduction with respect to the tape 10. Accordingly, a video signal which is recorded and reproduced as the head 12 scans over the tape 10, becomes as shown in FIG. 1B. That is, the video signal which is recorded and reproduced for every one field during every one revolution of the head 12, exists for the periods indicated by 15-1, 15-2, . . . , and the video signal lack period 16-1, . . . exist between the recorded and reproduced video signal periods 15-1, 15-2, . . . The lack periods 16-1, . . . correspond to periods in which the head 12 does not scan over the tape 10. In FIG. 11B, a period indicated by t corresponds to a normal one-field period. As described above, there was a disadvantage in that signal lacks are introduced because of the existence of the lack periods 16-1, . . . In addition, because the angular range with which the tape 10 is wound around the guide drum 14 by the guide poles 11a and 11b is large, there was a disadvantage in that the load on the tape travel became large.

Figure 2A:
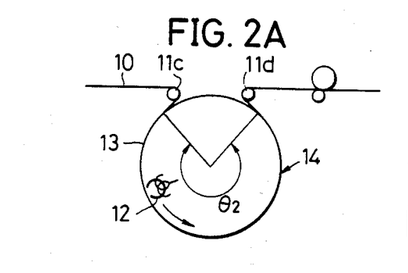
FIGS. 2A and 2B are a general plan view showing a guide drum part of an embodiment of a one-head system magnetic recording and reproducing apparatus supplied with the system according to the present invention, and a graph for explaining an existing period and a non-existing period of a reproduced signal in the apparatus supplied with the system according to the present invention.

Accordingly, the system according to the present invention has eliminated the above described disadvantages. As shown in FIG. 2A, in a one-head system magnetic recording and reproducing apparatus supplied with the system according to the present invention, a pair of guide poles 11c and 11d can be arranged and provided with a larger distance therebetween compared to the pair of guide poles 11a and 11b of the conventional apparatus shown in FIG. 1A. An angular range $\theta 2$ throughout which the tape 10 is wound around the guide drum 14, is determined by these guide poles 11c and 11d to a range in the order of 360° × $\frac{3}{4}$, for example. Hence, because the angular range with which the tape 10 is wound around the guide drum 14 by the guide poles 11c and 11d is smaller than the conventional angular range, the load on the tape travel is small compared to the load in the conventional apparatus.

Figure 2B:
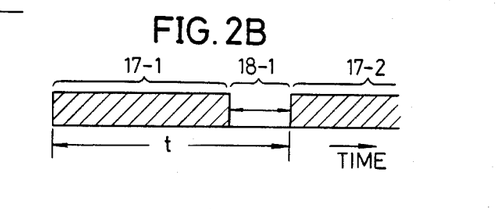

In the system according to the present invention, the video signal recorded onto and reproduced from the tape 10 by the single head 12, is compressed with respect to the time base in the recording system, as will be described hereinafter. Accordingly, the signal recorded and reproduced by the head 12 for each revolution of the head 12, throughout the angle $\theta 2$ with which the tape 10 is wound around the guide drum 14, is a signal with periods 17-1, 17-2, . . . indicated in FIG. 2B. Because this signal is compressed with respect to the time base, a video information content of one field exists in each of the signal periods 17-1, 17-2, . . . Periods 18-1, . . . in which signals do not exist, corresponding to periods in which the head 10 does not scan over the tape 10, exist between the signal periods 17-1, 17-2, . . . The signal reproduced with the signal periods 17-1, 17-2, . . . is expanded with respect to the time base, as will be described hereinafter, and obtained as a continuous reproduced signal having no signal lack.

Figure 3:
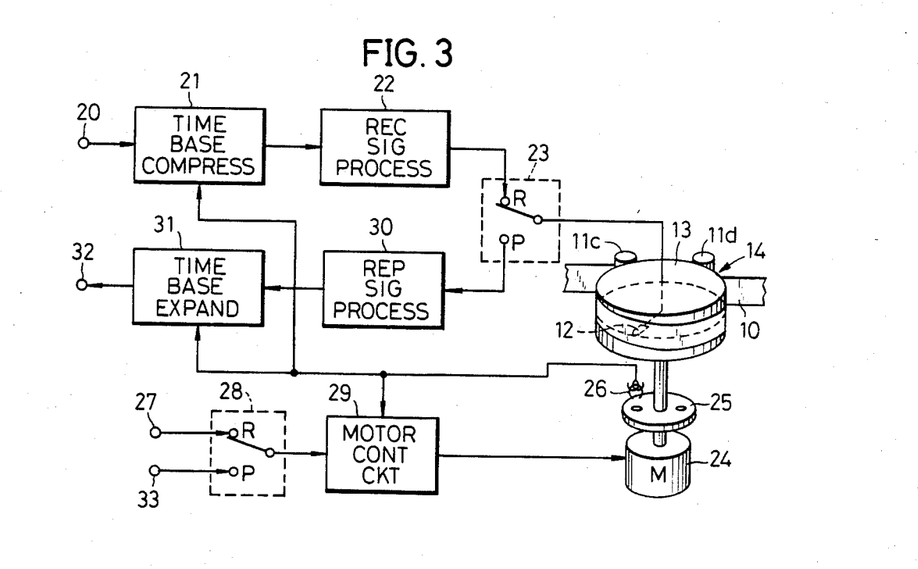
FIG. 3 is a general system block diagram showing an embodiment of a video signal magnetic recording and reproducing system according to the present invention.

An embodiment of the system according to the present invention is shown in the systematic block diagram of FIG. 3. Upon recording, a recording video signal from a terminal 20, is supplied to a time base compression circuit 21 wherein the recording video signal is compressed with respect to the time base as will be described hereinafter. An output signal of the time base compression circuit 21 is supplied to a recording signal processing circuit 22. As is well known, the recording video signal is separated into a luminance signal and a carrier chrominance signal at the recording signal processing circuit 22. Signal processing is performed so that the separated luminance signal is frequency-modulated, and the separated carrier chrominance signal is frequency-converted into a frequency band lower than that of the frequency-modulated luminance signal. An output signal of the recording signal processing circuit 22 is supplied to the single magnetic head 12 through a switching circuit 23 which is connected to the side of a contact R during the recording mode, and is recorded onto the magnetic tape 10.

The rotary drum 13 provided with the head 12, is rotated at a speed of one revolution for one field of the video signal, by a motor 24. That is, if the video signal is an NTSC system color video signal, the rotary drum 13 is rotated at a speed of sixty revolutions per second. As the motor 24 rotates, a pickup head 26 operates together with magnet pieces provided on a disc 25 which is fixed to a rotary shaft of the motor 24, to produce a rotary pulse (hereinafter referred to as a drum pulse). This drum pulse is supplied to the time base compression circuit 21 and a motor control circuit 29.

A vertical synchronizing signal separated from the recorded video signal is applied to a terminal 27, and supplied to the motor control circuit 29 through a switching circuit 28 which is connected to the side of a contact R. The phases of the drum pulse and the vertical synchronizing signal are compared at the motor control circuit 29, and the rotation of the motor 24 is controlled by an output control signal of the motor control circuit 29.

Figure 4:
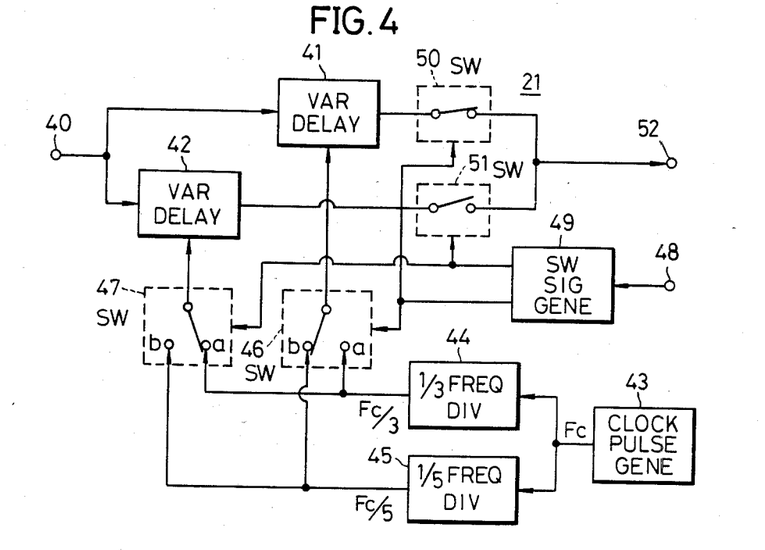
FIG. 4 is a system block diagram showing a time base compression circuit in the block system shown in FIG. 3.

An actual embodiment of the above time base compression circuit 21 is shown in FIG. 4. A recording video signal shown in FIG. 5(A) which is supplied to the time base compression circuit 21 through the terminal 20 shown in FIG. 3, is applied to first and second variable delay circuits 41 and 42 through a terminal 40 shown in FIG. 4. These first and second variable delay circuits 41 and 42 are provided as a time base compression device, and comprise a plurality of charge transfer elements such as CCD (charge coupled device) elements for transferring signals to the inner parts. The transferring speed, that is, the delay time of the signal at the variable delay circuits 41 and 42, is respectively varied according to the frequency of a clock pulse applied to a clock input terminal of these variable delay circuits 41 and 42. The time base compression is performed by periodically switching the delay times.

If the number of stages of the CCD elements in the variable delay circuits 41 and 42 is assumed to be N (N is an integer) and the delay time is designated by τ, the following relationship stands between a frequency fc of the clock pulse applied to the variable delay circuits 41 and 42.

$$fc = \frac{N}{2\tau}$$

Here, the CCD elements are assumed to be two-phase clock driven elements. When considering the transmission band of the CCD elements, the clock pulse becomes the sampling signal. Thus, in the case of the two-phase clock driven CCD elements, the sampling frequency becomes equal to 2fc, and the upper limit of the transmission band becomes equal to fc according to the sampling theorem. Accordingly, it is necessary to set the clock pulse frequency fc so that the frequency fc is larger than the upper limit frequency of the required transmission band.

A clock pulse having a frequency Fc which is generated by a clock pulse generating circuit 43, is supplied to a ⅓-frequency divider 44 and a 1/5-frequency divider 45. The clock pulse frequency Fc is frequency-divided into ⅓ and 1/5, respectively, at these frequency dividers 44 and 45. The clock pulse having the frequency Fc/3 obtained from the frequency divider 44, is applied to contacts a of switching circuits 46 and 47. On the other hand, the clock pulse having the frequency Fc/5 obtained from the frequency divider 45, is applied to contacts b of the switching circuits 46 and 47.

Figure 5:
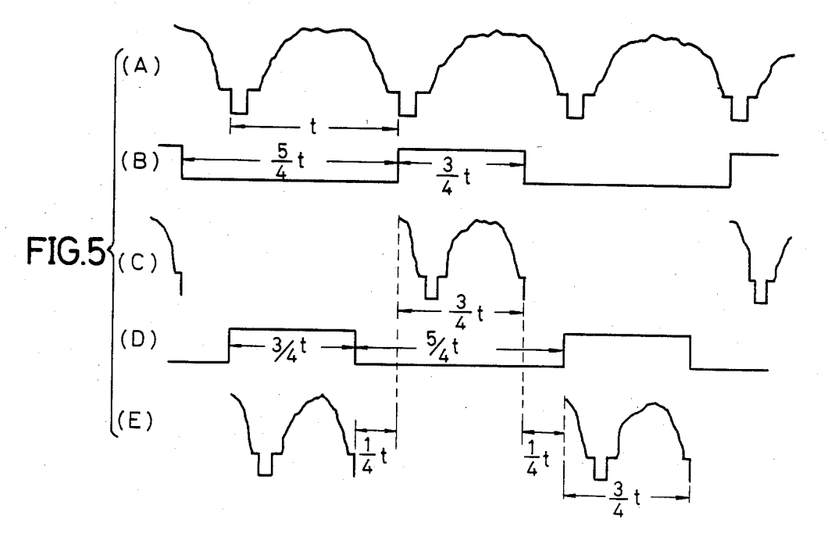
FIGS. 5(A) through 5(E) are graphs respectively showing signal waveforms at each part of the block system shown in FIG. 4.

The drum pulse from the pickup head 26 is supplied to a switching signal generating circuit 49 through a terminal 48. This switching signal generating circuit 49 generates switching signals respectively having waveforms shown in FIGS. 5(B) and 5(D). For example, the switching signal generating circuit 49 comprises a first monostable multivibrator which is triggered by a rise in the drum pulse to produce a high-level output for an interval 3t/4 (t indicates a one-field period), and a second monostable multivibrator which is supplied with the drum pulse through an inverter and is triggered by a rise in this signal (corresponding to a fall in the drum pulse) to produce a high-level output for an interval 3t/4. These first and second monostable multivibrators respectively produce signals having waveforms shown in FIGS. 5(B) and 5(D). The switching signal shown in FIG. 5(B) is in synchronism and rises with every second vertical synchronizing signal of the video signal shown in FIG. 5(A), and is of high level for an interval 3t/4 and is of low level for an interval 5t/4. On the other hand, the switching signal shown in FIG. 5(D) is in synchronism and rises with the other every second vertical synchronizing signal of the video signal, and is of high level for an interval 3t/4 and is of low level for an interval 5t/4.

The switching signal shown in FIG. 5(B) obtained from the switching signal generating circuit 49 is supplied to the switching circuits 46 and 50, while the switching signal shown in FIG. 5(D) is supplied to the switching circuits 47 and 51. The switching circuits 46 and 47 are respectively connected to the side of the contact a during the high-level period of the applied switching signal and connected to the side of the contact b during the low-level period of the applied switching signal. On the other hand, the switching circuits 50 and 51 are respectively closed during the high-level period and opened during the low-level period of the applied switching signal.

During the interval 5t/4 in which the switching signal shown in FIG. 5(B) is of low level, the clock pulse from the frequency divider 45 having the lower frequency Fc/5 is applied to the first variable delay circuit 41 through the switching circuit 46. Hence, write-in of the video signal from the terminal 40 is performed at a slow speed. Next, during the interval 3t/4 in which the switching signal shown in FIG. 5(B) is of high level, the clock pulse from the frequency divider 44 having the higher frequency Fc/3 is applied to the variable delay circuit 41 through the switching circuit 46. Thus, read-out of the above written-in video signal is performed at a high speed. Here, the switching circuit 50 is closed during the high-level period of the above switching signal. At this point in time, a signal obtained by compressing the time base of the video signal having a duration 5t/4 into a video signal of a duration 3t/4, is obtained from the variable delay circuit 41 through the switching circuit 50, at a rate of once for every two-field period, as shown in FIG. 5(C).

Similarly, the second variable delay circuit 42 performs write-in by the clock pulse from the frequency divider 45 having the frequency Fc/5, for an interval 5t/4, according to the switching signal shown in FIG. 5(D). During the next interval 3t/4, the variable delay circuit 42 performs read-out of the clock pulse from the frequency divider 44 having the frequency Fc/3. Accordingly, a time base compressed signal shown in FIG. 5(E) is obtained from the variable delay circuit 42 through the switching circuit 51. As clearly understood by comparing the waveforms shown in FIGS. 5(B) and 5(E), the signal obtained from the second variable delay circuit 42 is obtained at a rate of once for every two-field period, and the signals from the first and second variable delay circuits 41 and 42 are alternately obtained. The time base compressed signals shown in FIGS. 5(B) and 5(E) which are obtained from the switching circuits 50 and 51 are added and then obtained from an output terminal 52. The signal from the output terminal 52 is supplied to the head 12 through the switching circuit 23 shown in FIG. 3, and is recorded onto the tape 10.

The signal recorded onto the tape 10 is a signal obtained by successively compressing the time base of the signal having 5/4 fields of video information into the signal having a duration corresponding to ¾ fields of video information. In addition, between signals subjected to time base compression for each 5/4 fields, there is a time interval corresponding to t/4 (¼ field). As described in conjunction with FIG. 2A, the tape 10 travels in a state wound around the guide drum 14 throughout an angular range (¾ revolution around the guide drum 14, for example) determined by the guide poles 11c and 11d. Accordingly, the signal subjected to time base compression and having the period 3t/4, is recorded onto the tape 10 for each revolution of the head 12. During the interval (t/4) in which the head 12 rotates over the section between the guide poles 11c and 11d where the tape 10 is not wound around the guide drum 14, recording of a signal is not performed. However, because no recorded signals exist in this interval t/4, no inconveniences are introduced. Thus, although there are intervals of t/4 in which the head 12 does not perform recording with respect to the tape 10, the entire video information content is subjected to time base compression and recorded onto the tape 10 without signal lack.

Figure 7:
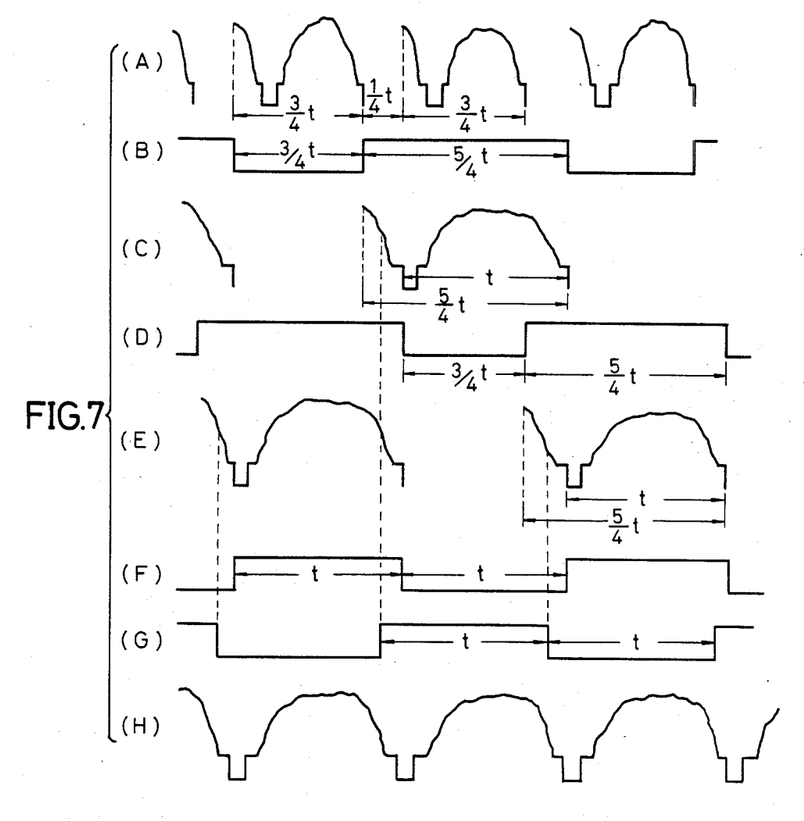
FIGS. 7(A) through 7(H) are graphs respectively showing signal waveforms at each part of the block system shown in FIG. 6.

Upon reproduction, a signal shown in FIG. 7(A) which is subjected to time base compression, is reproduced from the tape 10 by the head 12 in FIG. 3. The reproduced signal is supplied to a reproduced signal processing circuit 30 through the switching circuit 23 which is connected to the side of a contact P during a reproduction mode. This reproduced signal is separated into the frequency-modulated luminance signal and the frequency-converted carrier chrominance signal at the reproduced signal processing circuit 30. The frequency-modulated luminance signal is demodulated and restored into the original luminance signal, and the frequency-converted carrier chrominance signal is frequency-converted and restored into the carrier chrominance signal in the original band.

An output signal of the reproduced signal processing circuit 30 is supplied to a time base expansion circuit 31. The signal supplied to the time base expansion circuit 31 is subjected to time base expansion, and restored into a continuous signal with the original time base. Thus, a continuous reproduced signal shown in FIG. 7(H) having no signal dropout, is obtained from an output terminal 32.

During the above reproduction mode, a reference signal applied to a terminal 33, is supplied to the motor control circuit 29 through the switching circuit 28 which is connected to the side of the contact P. The motor control circuit 29 compares the phases of the drum pulse from the pickup head 26 and the reference signal, to control the rotation of the motor 24 by the output control signal of this motor control circuit 29.

Figure 6:
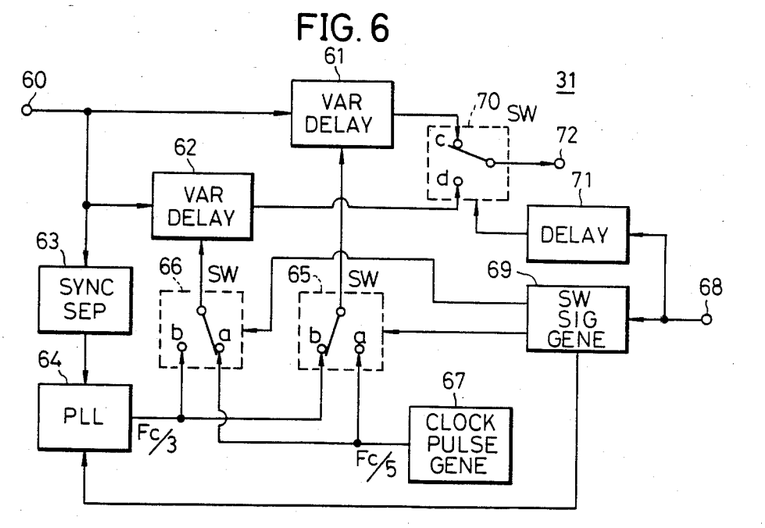
FIG. 6 is a system block diagram showing an embodiment of a time base expansion circuit in the block system shown in FIG. 3.

An actual embodiment of the above time base expansion circuit 31 is shown in FIG. 6. The signal from the reproduced signal processing circuit 30 is supplied to first and second variable delay circuits 61 and 62, and a synchronizing signal separation circuit 63, from a terminal 60. The first and second variable delay circuits 61 and 62 are provided as a time base expander. The horizontal synchronizing signal is separated at the synchronizing signal separation circuit 63, and supplied to a phase locked loop (PLL) circuit 64. The PLL circuit 64 becomes synchronized with the horizontal synchronizing signal supplied thereto, to generate a clock pulse having a frequency Fc/3. This clock pulse is applied to contacts b of switching circuits 65 and 66. A clock pulse generator 67 generates a clock pulse having a frequency Fc/5, and supplies this clock pulse to contacts a of the switching circuits 65 and 66.

The drum pulse from the pickup head 26 is supplied to a switching signal generating circuit 69 and a delay circuit 71, through a terminal 68. The switching signal generating circuit 69 generates switching signals respectively having waveforms shown in FIGS. 7(B) and 7(D). The switching signals are of high level for a period 5t/4, and of low level for a succeeding period 3t/4. These switching signals are respectively applied to the switching circuits 65 and 66. The switching circuits 65 and 66 are respectively connected to the side of the contact b during the low-level period of the applied switching signal, and connected to the side of the contact a during the high-level period of the applied switching signal.

The first variable delay circuit 61 supplied with the signal shown in FIG. 7(A), is supplied with the clock pulse having the frequency Fc/3 which is obtained from the PLL circuit 64 through the switching circuit 65, during the low-level period 3t/4 of the switching signal shown in FIG. 7(B). Hence, the signal subjected to time base compression having the period 3t/4, is written-in at a high speed. Next, during the high-level period 5t/4 of the switching signal, the variable delay circuit 61 is supplied with the clock pulse having the frequency Fc/5. Accordingly, read-out is performed at a slow speed. Therefore, the signal subjected to time base compression and having the period 3t/4, is subjected to time base expansion and restored into the signal having the period 5t/4. This restored signal shown in FIG. 7(C) is obtained from the variable delay circuit 61.

Similarly, the second variable delay circuit 62, is supplied with the clock pulse having the frequency Fc/3 which is obtained from the PLL circuit 64 through the switching circuit 66, during the low-level period 3t/4 of the switching signal shown in FIG. 7(D). Hence, the signal subjected to time base compression having the period 3t/4, is written-in at a high speed. Next, during the high-level period 5t/4 of the switching signal, the variable delay circuit 62 is supplied with the clock pulse having the frequency Fc/5. Accordingly, read-out is performed at a slow speed. Therefore, the signal subjected to time base compression and having the period 3t/4, is subjected to time base expansion and restored into the signal having the period 5t/4. This restored signal shown in FIG. 7(E) is obtained from the variable delay circuit 62.

On the other hand, the drum pulse shown in FIG. 7(F) which is supplied to the delay circuit 71 through the terminal 68, is delayed by a period slightly less than 1t (one field) and formed into a signal shown in FIG. 7(G). The output signal of the delay circuit 71 is applied to a switching circuit 70 as a switching signal. The outputs of the variable delay circuits 61 and 62 are respectively applied to contacts c and d of the switching circuit 70. The switching circuit 70 is connected to the side of the contact c during the high-level period of the applied switching signal, and connected to the side of the contact d during the low-level period of the applied switching signal. Accordingly, a continuous reproduced video signal with the normal time base, having no signal lack and no signal overlap as shown in FIG. 7(H), is obtained from an output terminal 72.

As shown in FIG. 7(A), there is an interval t/4 in which signals do not exist for every period 3t/4, in the signal applied to the terminal 60. Thus, the horizontal synchronizing signal supplied to the PLL circuit 64 does not exist during the interval t/4 which occurs for every period 3t/4. Accordingly, the PLL circuit 64 comprises a previous value holding circuit. This previous value holding circuit is operated by an AND output signal of the switching signals shown in FIGS. 7(B) and 7(D) which are obtained from the switching signal generating circuit 69, and holds the previous value during the above interval t/4 in which the horizontal synchronizing signal does not exist. Hence, the PLL circuit 64 continues to operate normally even during the interval in which the horizontal synchronizing signal does not exist, and the oscillation will not become unstable.

In addition, the clock pulses for write-in with respect to the variable delay circuits 61 and 62 are obtained from the output of the PLL circuit in synchronism with the horizontal synchronizing signal of the reproduced signal, in the reproducing system. Thus, even if there is a time base deviation component such as jitter and skew in the reproduced signal obtained from the head 12, the above time base deviation component is compensated and eliminated upon write-in, because the write-in operation is performed by a clock pulse which is given the same time base deviation component.

In the above described embodiment, variable delay circuits are used for the time base compressor and the time base expander. However, these time base compressor and expander are not limited to the above, and memories may be used, for example.

In a case where a field memory having a digital memory is used in which the write-in and read-out can be performed independently without a mutual relationship and the read-out of an arbitrary position can be performed, a so-called system conversion in which the field frequency and the number of horizontal scanning lines are converted upon reproduction can be performed simultaneously with the above time base expansion. Explaining this in more detail, the field memory has a two-dimensional construction. The video signal in one horizontal synchronizing period can be stored into the memory in the X-direction, and there are 329 memory elements in the Y-direction. If the number of horizontal scanning lines for one field of the video signal which is not subjected to the time base compression is 262.5 (NTSC system), the video signal information for 5/4 fields will be included for one revolution of the rotary head (one track) as a result of the time base compression. Accordingly, $262.5 \times 5/4 = 329$ memories are required in the Y-direction of the field memory. The reproduced video signal in which the time base is compressed, is subjected to analog-to-digital (A/D) conversion, and successively stored into the memory in the X-direction for every one horizontal scanning period, and further, successive storing is performed with respect to the Y-direction. Next, upon read-out from the field memory, a control signal for specifying the order of read-out is formed from a reference signal of a desired signal system. As is well known, the conversion of the number of horizontal scanning lines is performed by reading out one horizontal scanning period with duplication or with omission for every predetermined number of horizontal scanning periods. The conversion of the field frequency is similarly performed by reading out with duplication or with omission. The conversion may be performed upon write-in, instead of performing upon read-out. The signal read out from the memory is subjected to digital-to-analog (D/A) conversion, and formed into a reproduced video signal. If the same field is repeatedly read out, it is possible to obtain a still picture.

In the present embodiment, the time base compression was performed with respect to a video signal of 5/4 fields, during one revolution of the rotary head (one track). However, the time base compression is not limited to the above, and the time base compression may be performed with respect to a video signal of more fields, according to the characteristics of the variable delay circuits and the memory capacities of the memories.

In the above described embodiment, description was given for a case when the system according to the present invention is applied to the one-head system magnetic recording and reproducing apparatus. However, the system according to the present invention may be applied to apparatuses using a plurality of heads, that is, to a two-head system magnetic recording and reproducing apparatus, for example. In such a case, the effect of the present invention as a countermeasure to the interval in which the head does not scan over the tape, is not obtained as in the case where the present invention is applied to the one-head system magnetic recording and reproducing apparatus. However, a margin in which the video signal is not recorded, is introduced in each scanning track of each head. For example, other signals such as an audio signal in which the time base is compressed may be recorded in this margin, to increase the tape utilization efficiency.

Further, the present invention is not limited to these embodiments, but various variations and modifications may be made without departing from the scope of the present invention.

What is claimed is:

1. A recording system for a helical scan type magnetic video signal recording apparatus, said recording apparatus comprising a guide drum including a rotary drum, signal rotary magnetic head means mounted on the rotary drum, a pair of guide poles for guiding and wrapping a magnetic tape around an outer peripheral surface of said guide drum over an angular range of $\theta$, where $\theta$, is smaller than 360°, and rotation detecting means for producing a square wave signal having a frequency responsive to the rotational speed of said rotary drum, said head means forming tracks which are oblique to the longitudinal direction of the magnetic tape, said head means undergoing one revolution in a time period t which is equal to the length of one field of an input video signal, said head means being out of contact with the magnetic tape for a predetermined time period $\Delta t$ in each revolution thereof as said head means rotates over an angle of $(360° - \theta)$, said recording system comprising:

first and second memory means supplied with the input video signal;

clock pulse generating means for generating a write-in clock pulse signal and a read-out clock pulse signal, said write-in clock pulse signal having a frequency which is lower than a frequency of the read-out clock pulse signal;

switching means responsive to the output square wave signal of the rotation detecting means for selectively supplying the write-in and read-out clock pulse signals to the first and second memory means; and adding means for adding output signals of the first and second memory means, said switching means repeating an operation in which the write-in clock pulse signal is supplied to the first memory means during a first time period and the read-out clock pulse signal is supplied to the first memory means during an immediately subsequent second time period, said first time period having a length $(t + \Delta t)$ so that the first memory means writes therein the video signal corresponding to $(t + \Delta t)$ fields, where $\Delta t$ is smaller than t, said second time period having a length $(t - \Delta t)$ so that the first memory means reads therefrom the stored video signal within a time period $(t - \Delta t)$ and produces the read out video signal as a first time base compressed output signal, said switching means also repeating an operation in which the write-in clock pulse signal is supplied to the second memory means during a third time period and the read-out clock pulse signal is supplied to the second memory means during an immediately subsequent fourth time period, said third time period starting from a time which is after a starting point of the first time period by a time t, said third time period having a length $(t + \Delta t)$ so that the second memory means writes therein the video signal corresponding to (t+Δt) fields, said fourth time period having a length (t−Δt) so that the second memory means reads therefrom the stored video signal within a time period (t−Δt) and produces the read out video signal as a second time base compressed output signal, said adding means producing an added signal which time-sequentially comprises the first and second time base compressed output signals of the first and second memory means, said added signal having an information signal blank of Δt between the first and second time base compressed output signals, said head means being supplied with the added signal of said adding means, said head means recording the first time base compressed output signal on a first track, rotating over the angle of (360°−θ) during the information signal blank of the added signal, and recording the second time base compressed output signal on a second track which is adjacent to the first track, so that each of the first and second tracks contains time base compressed video information corresponding to (t+Δt) fields of the input video signal.

2. A recording system as claimed in claim 1 in which Δt is equal to t/4.

3. A recording system as claimed in claim 1 in which said first and second memory means are variable delay circuits using CCD elements.

4. A recording system as claimed in claim 1 in which said switching means comprises switching signal generating means responsive to the output square wave signal of the rotation detecting means for generating first and second switching signals, first switch means responsive to the first switching signal for selectively supplying the write-in and read-out clock pulse signals supplied thereto to the first memory means, and second switch means responsive to the second switching signal for selectively supplying the write-in and read-out pulse signals to the second memory means, said first switching signal causing said first switch means to supply the write-in clock pulse signal to the first memory means during the first time period and causing said first switch means to supply the read-out clock pulse signal to the first memory means during the second time period, said second switching signal causing said second switch means to supply the write-in clock pulse to the second memory means during the third time period and causing said second switch means to supply the read-out clock pulse signal to the second memory means during the fourth time period.

5. A recording and reproducing system for a helical scan type magnetic video signal recording and reproducing apparatus, said recording and reproducing apparatus comprising a guide drum including a rotary drum, single rotary magnetic head means mounted on the rotary drum, a pair of guide poles for guiding and wrapping a magnetic tape around an outer peripheral surface of said guide drum over an angular range of θ, where θ is smaller than 360°, and rotation detecting means for producing a square wave signal having a frequency responsive to the rotational speed of said rotary drum, said head means scanning over tracks which are oblique to the longitudinal direction of the magnetic tape, said head means undergoing one revolution in a time period t which is equal to the length of one field of an input video signal, said head means being out of contact with the magnetic tape for a predetermined time period Δt in each revolution thereof as said head means rotates over an angle of (360°−θ), a recording system of said recording and reproducing system comprising:

first and second memory means supplied with the input video signal;

first clock pulse generating means for generating a first write-in clock pulse signal and a first read-out clock pulse signal, said write-in clock pulse signal having a frequency which is lower than a frequency of the first read-out clock pulse signal;

first switching means responsive to the output square wave signal of the rotation detecting means for selectively supplying the first write-in and read-out clock pulse signals to the first and second memory means; and adding means for adding output signals of the first and second memory means, said first switching means repeating an operation in which the first write-in clock pulse signal is supplied to the first memory means during a first time period and the first read-out clock pulse signal is supplied to the first memory means during an immediately subsequent second time period, said first time period having a length (t+Δt) so that the first memory means writes therein the video signal corresponding to (t+Δt) fields, where Δt is smaller than t, said second time period having a length (t−Δt) so that the first memory means reads therefrom the stored video signal within a time period (t−Δt) and produces the read out video signal as a first time base compressed output signal, said first switching means also repeating an operation in which the first write-in clock pulse signal is supplied to the second memory means during a third time period and the first read-out clock pulse signal is supplied to the second memory means during an immediately subsequent fourth time period, said third time period starting from a time which is after a starting point of the first time period by a time t, said third time period having a length (t+Δt) so that the second memory means writes therein the video signal corresponding to (t+Δt) fields, said fourth time period having a length (t−Δt) so that the second memory means reads therefrom the stored video signal within a time period (t−Δt) and produces the read out video signal as a second time base compressed output signal, said adding means producing an added signal which time-sequentially comprises the first and second time base compressed output signals of the first and second memory means, said added signal having an information signal blank of Δt between the first and second time base compressed output signals, said head means being supplied with the added signal of said adding means during a recording mode, said head means recording the first time base compressed output signal on a first track, rotating over the angle (360°−θ) during the information signal blank of the added signal, and recording the second time base compressed output signal on a second track which is adjacent to the first track, so that each of the first and second tracks contains time base compressed video information corresponding to (t+Δt) fields of the input video signal, said head means reproducing the recorded video signal from the magnetic tape during a reproducing mode, a reproducing system of said recording and reproducing system comprising:

third and fourth memory means supplied with the video signal reproduced by the head means;

second clock pulse generating means for generating a second write-in clock pulse signal and a second read-out clock pulse signal having a frequency which is lower than a frequency of the second read-out clock pulse signal;

second switching means responsive to the output square wave signal of the rotation detecting means for selectively supplying the second write-in and read-out clock pulse signals to the third and fourth memory means; and third switching means responsive to the output square wave signal of the rotation detecting means for selectively passing output signals of the third and fourth memory means, said second switching means repeating an operation in which the second write-in clock pulse signal is supplied to the third memory means during a fifth time period and the second read out clock pulse is supplied to the third memory means during an immediately subsequent sixth time period, said fifth time period having a length $(t-\Delta t)$, said sixth time period having a length $(t+\Delta t)$ so that the third memory means reads therefrom the stored reproduced video signal within a time period $(t+\Delta t)$ and produces the read out reproduced video signal as a first time base expanded output signal, said switching means also repeating an operation in which the second write-in clock pulse signal is supplied to the fourth memory means during a seventh time period and the second read-out clock pulse signal is supplied to the fourth memory means during an immediately subsequent eighth time period, said seventh time period starting from a time which is after a starting point of the fifth time period by a time t, said seventh time period having a length $(t-\Delta t)$, said eighth time period having a length $(t+\Delta t)$ so that the fourth memory means reads therefrom the stored reproduced video signal within a time period $(t+\Delta t)$ and produces the read out video signal as a second time base expanded output signal, said third switching means producing a continuous reproduced video signal having a signal waveform which is substantially the same as a signal waveform of the input video signal.

6. A recording and reproducing system as claimed in claim 5 in which said first write-in clock pulse signal and said second read-out clock pulse signal have the same frequency, and said first read-out clock pulse signal and said second write-in clock pulse signal have the same frequency.

7. A recording and reproducing system as claimed in claim 5 in which said second switching means comprises switching signal generating means responsive to the output square wave signal of the rotation detecting means for generating first and second switching signals, first switch means responsive to the first switching signal for selectively supplying the second write-in and read-out clock pulse signals supplied thereto to the third memory means, and second switch means responsive to the second switching signal for selectively supplying the second write-in and read-out clock pulse signals to the fourth memory means, said first switching signal causing said first switch means to supply the second write-in clock pulse to the third memory means during the fifth time period and causing said first switch means to supply the second read-out clock pulse signal to the third memory means during the sixth time period, said second switching signal causing said second switch means to supply the second write-in clock pulse signal to the fourth memory means during the seventh time period and causing said second switch means to supply the second read-out clock pulse signal to the fourth memory means during the eighth time period.

8. A recording and reproducing system as claimed in claim 5 in which said second clock pulse generating means comprises separating means for separating a horizontal synchronizing signal from the video signal reproduced by the head means, a PLL circuit responsive to the separated horizontal synchronizing signal for generating the second write-in clock pulse signal, and a clock pulse generator for generating the second read-out clock pulse signal.

9. A recording and reproducing system as claimed in claim 8 in which said PLL circuit comprises a previous value holding circuit for holding the value of the horizontal synchronizing signal which is obtained immediately before a certain time period in which no signal is reproduced by the head means, so as to continue a normal clock pulse generating operation during the certain time period.

* * * * *